W. C. Bartol,
Brick Machine.
No. 60,323.          Patented Dec. 11, 1866.
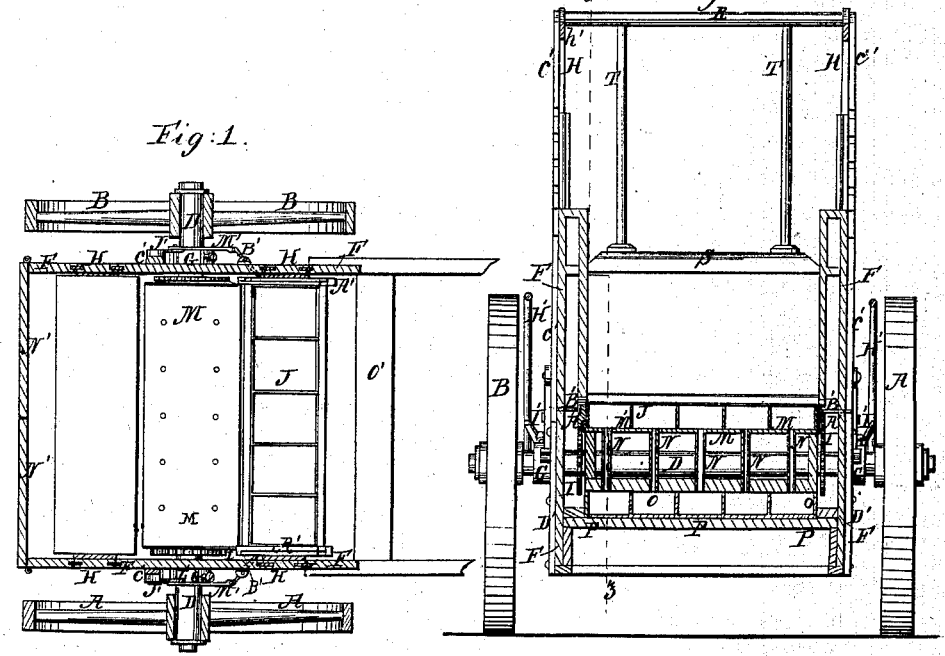
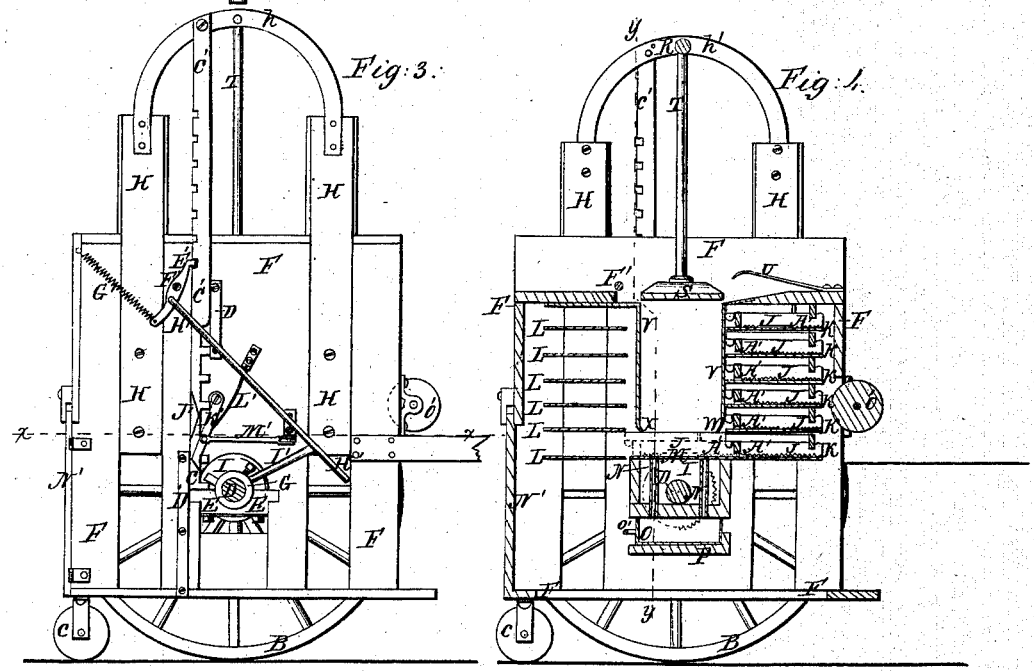
Witnesses:
Theo. Tusch
J. A. Service
Inventor:
W. C. Bartol
Per Munn & Co
Attorneys

United States Patent Office.

IMPROVED BRICK MACHINE.

WILLIAM C. BARTOL, OF HUNTINGDON, PENNSYLVANIA.

Letters Patent No. 60,323, dated December 11, 1866.

The Schedule referred to in these Letters Patent and making part of the same.

TO ALL WHOM IT MAY CONCERN:

Be it known that I, WILLIAM C. BARTOL, of Huntingdon, in the county of Huntingdon, and State of Pennsylvania, have invented a new and useful Improvement in Brick Machine; and I do hereby declare that the following is a full, clear, and exact description thereof, which will enable others skilled in the art to make and use the same, reference being had to the accompanying drawings, forming part of this specification, in which—

Figure 1 is a horizontal section of my improved machine, taken through the line $x\,x$, fig. 3.

Figure 2 is a vertical cross-section of the same, taken through the line $y\,y$, fig. 4.

Figure 3 is a side view of the same, the wheel being removed to show the construction.

Figure 4 is a vertical longitudinal section of the same, taken through the line $z\,z$, fig. 2.

Similar letters of reference indicate like parts.

My invention consists in an improved brick machine, so constructed and arranged as hereinafter more fully described, that the empty moulds may be raised automatically from the lower to the upper part of the machine while it is being drawn to the pit where the clay is prepared for moulding; and so that after the tempered clay has been put into the hopper, while the machine is being drawn from the pit to the floor where the moulded brick are dried, the said empty moulds may automatically be lowered, passed beneath the hopper, filled, and passed out upon shelves at the other end of the machine, ready for removal to the drying floor.

A and B are the wheels upon which the machine is supported, and by the movements of which it is operated. One or more small wheels, as C, may be placed under the ends of the machine to hold it in an erect position while being loaded and unloaded. The wheel A revolves loosely upon the axle or shaft D, but the wheel B is securely attached to said shaft, and carries it with it as it revolves. The shaft D revolves in bearings, E, attached to the sides of the frame or box, F, as shown in fig. 3. G are small wheels attached to the shaft D, upon the outside of and close to the box or frame F, as shown in figs. 1 and 2. Each of the wheels G is furnished with one cog, as shown in fig. 3, for the purpose of raising and lowering the slides H, as hereinafter described. I are cog-wheels attached to the shaft D within the sides of the frame or box F, as shown in figs. 1 and 2, for the purpose of transferring the moulds, J, from one end of the box F to the other, as hereinafter described. The box or frame F is a little longer than three times the breadth of the moulds J, as shown in fig. 4, and has six shelves, K and L, formed in each end, as shown in fig. 4, for the reception of the moulds J. The ends of the shelves K L are securely attached to the slides H, and they are so arranged that when the said slides H are raised to their full height the lowest shelf on each side shall be in a line with the stationary shelf, M. The shelf M is securely attached to the frame of the machine, and has holes through it in which are placed pipes, N, through which the surplus clay that escapes from the moulds J may flow to the mould O, upon the shelf P. The mould O remains permanently upon the shelf P, except when drawn out by hand by means of the handle $o'$, to be emptied. The two slides, H, on each side of the machine, and to which the shelves are attached, are connected together at their upper ends by the arches $h'$, and the two arches are connected to each other at their centres by the shaft R, from which the presser S is suspended by means of the rigid arms T. When the slides H have been raised to their full height, the presser S may be swung to one side, over the end of the box or frame F, where it is held out of the way by the spring-catch U, while the hopper V, in which it works, is being filled with clay. The lower edge of that side of the hopper V, at which the moulds J enter, terminates in an apron, W, slightly inclined inward, which gives to allow the said moulds to enter, and which, when the clay is acted upon by the presser S, is forced down close upon the side of said mould, to prevent the escape of the clay over its sides. Upon the lower edge of the other side of the hopper V, is formed, or to it is attached, a knife or scraper, X, slightly inclined inward, which cuts or scrapes the surplus clay from the top of the moulds as they are being drawn out from beneath the hopper V, and forced upon the shelves L. The moulds J have toothed racks, A′, attached to their ends, teeth downward, as shown in fig. 4, into the teeth of which the teeth of the cog-wheels I mesh to draw the moulds upon and from the shelf M. The teeth are cut away from the middle part of the racks upon the upper and lower moulds, for the purpose hereinafter described. The racks A′ have grooves formed upon the outer side of their upper edges, to enable them to pass the pins, B′, and upon the inner sides of their lower edges to receive the flanges formed upon the ends of the stationary shelf M, which keep them in their proper relative positions, and guide them while upon and passing across said shelf. The racks A′ also have hooks formed upon their ends, the rear hooks turning upward, and the forward hooks turning downward, so that the forward hooks of each mould may interlock with the rear hooks of the preceding mould, and be drawn forward by it until the teeth of the wheels I can act upon the teeth of the racks of the following mould. The hooks and teeth of the racks A' are so formed that when the hooks are interlocked as described, the teeth may be continuous and act as one rack. C' are vertical racks, the upper ends of which are securely attached to the arches h', of the slides H, as shown in figs. 3 and 4, and which move up and down upon the outside surface of the box F, where they are kept in proper position by the guide-bars D', as shown in fig. 3. These racks, C', have teeth or notches formed in the front edges of their upper parts to receive the stop-catch E', and teeth or notches formed in the rear edges of their lower parts for the cog of the wheels G to take hold of to raise or lower the said racks and their attachments. The catches E' are securely attached to the opposite ends of the shaft F', which passes through the machine from side to side, so that the said catches may act simultaneously. The lower ends of the catches are held forward, forcing their upper ends back against the racks C', by the springs G', as shown in fig. 3. H' are arms attached to the catches E', and extending down so as to be reached and operated to lift the said catches away from the racks C', by the arms I', attached to the wheels G, in such positions that they will operate the arms H' and raise the stop-catches E' whenever the cog of the said wheel G comes in contact with the teeth of the racks C', to either raise or lower them. J' are projections formed upon the sides of the racks C', near their lower ends, the rear edges of which are made in the form of a double inclined plane. K' is a lever, the upper end of which is pivoted to the side of the box or frame F, and its free end is held forward by the spring L', into a position to be acted upon by the projection J', as the racks C' move up or down. M' is a connecting-rod, one end of which is pivoted to the lever K', and the other end is pivoted to the projecting end of the pin B', which passes in through and is pivoted to the side of the box or frame F, as shown in fig. 1. Whenever the projection J' comes in contact with the end of the lever K', the pin B' is forced inward and forward, striking against a pin permanently attached to the racks of the upper and lower moulds, as shown in fig. 4, and moving them forward so that the teeth of the wheels I may come in contact with the remaining teeth of said racks. This occurs whether the machine is moving forward or backward. In the one case the machine is moving in the same direction in which the mould is moved, and the wheels I carry it onward drawing the next mould into its place. But in the other case the machine is moving in the opposite direction from that in which the mould is moved, and the wheels I immediately carry it back into its former position. When the machine is at the pit the parts are in the positions shown in fig. 3. The presser S is then thrown back and secured by the spring-catch U. The hopper is then filled with prepared clay, the presser S released, and the machine drawn towards the drying floor. The first effect is to raise the catch E', and lower the slides C'; this fills the mould upon the shelf M, and lowers the shelves K L, so that the mould upon the lowest shelf, K, may interlock with the one upon the stationary shelf, M. The next effect is to operate the pins B' and push the full mould forward, so that the teeth of the wheels I may take hold of the rack teeth and push the full mould upon the lowest shelf, L, and drawing the empty mould upon the shelf M. By this time the wheels have made an entire revolution, and the racks, slides, and shelves, are again lowered, interlocking the next empty mould upon the shelves K with the one upon shelf M, and unlocking the full mould upon the lowest shelf, L, and lowering it so that the next shelf is ready to receive the next full mould. Upon arriving at the drying floor the moulds will all be filled and lowered in front of the doors N', ready to be taken out, except the one that remains upon the stationary shelf M. The moulds are then taken out, emptied, and placed upon the shelves in the rear end of the machine, in such a position that when the shelves are raised the moulds may pass up without striking against the mould upon the shelf M. The machine is then drawn back to the pit. This revolves the wheels in the opposite direction and raises the racks, slides, and shelves. As the shelves K pass above the plane of the stationary shelf M, the rear edges of the empty moulds strike against the roller O', and are by it pushed forward so as to be in a postion to interlock with the one upon the shelf M, as they descend, as before described.

Having thus described my invention, what I claim as new, and desire to secure by Letters Patent, is—

1. Operating the machinery for moulding brick from the drive or supporting wheel, or wheels of the machine, substantially in the manner herein shown and described.

2. The combination of the slides H, racks C', cog-wheels G, and shaft D, with each other, substantially as herein shown and described, for the purpose of raising and lowering the shelves and moulds as set forth.

3. The combination of the catches E', spring G', and arms H' I', with each other, and with the racks C' and wheels G, substantially as herein shown and described, and for the purpose set forth.

4. The combination of the racks A', and cog-wheels I with each other, and with the moulds J and shaft D, substantially as herein shown and described, and for the purpose set forth.

5. The combination of the pins B', connecting-rods M', pivoted levers K', and springs L', with each other and with the projections J', of the racks C', substantially as herein shown and described, and for the purpose set forth.

The above specification of my invention signed by me this 13th day of October, 1866.

WM. C. BARTOL.

Witnesses:
    F. M. HIGGINS,
    ELIAS BARTOL.